Figure 1:
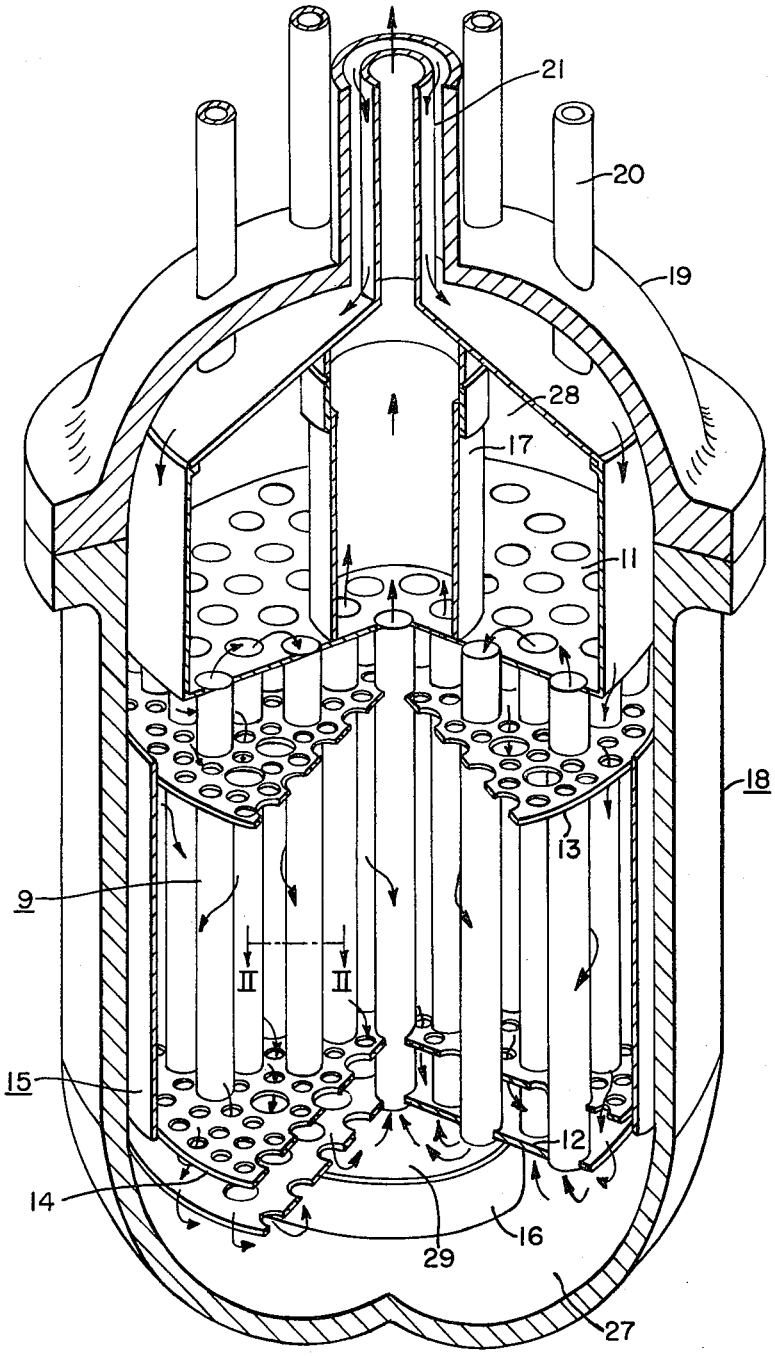
Figure 2:
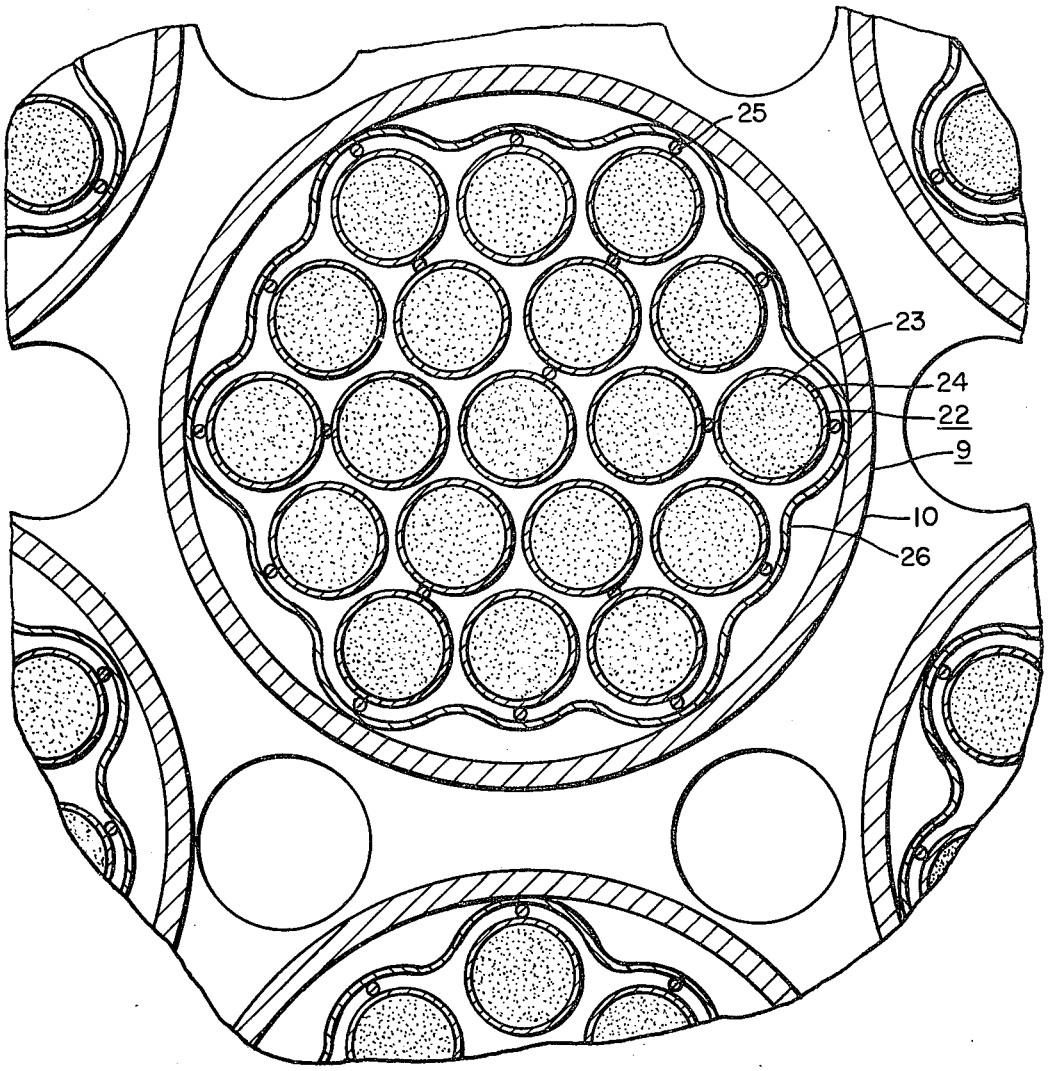
Figure 4:
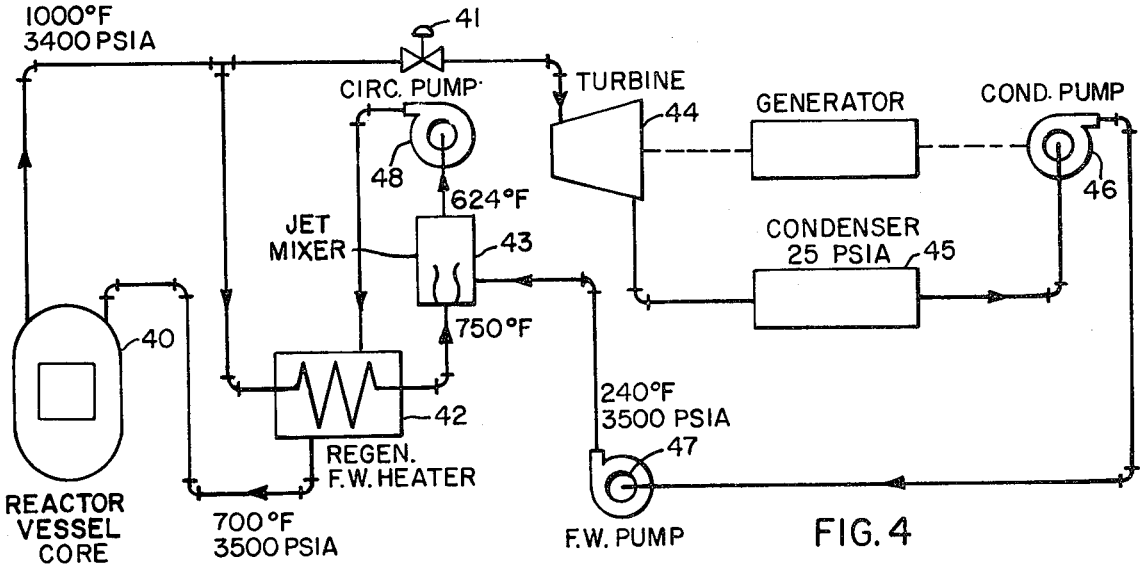
Figure 3:
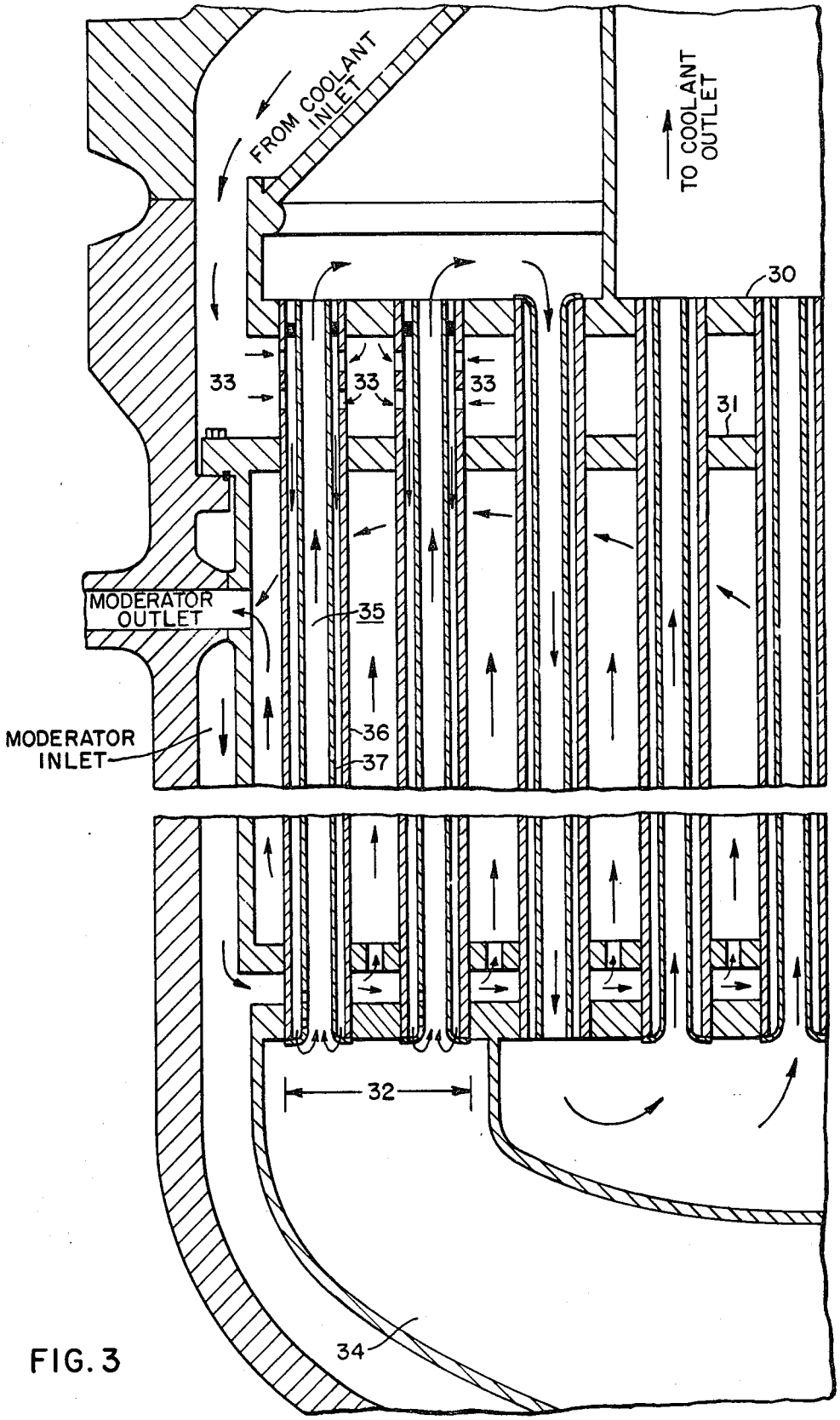
Figure 5:
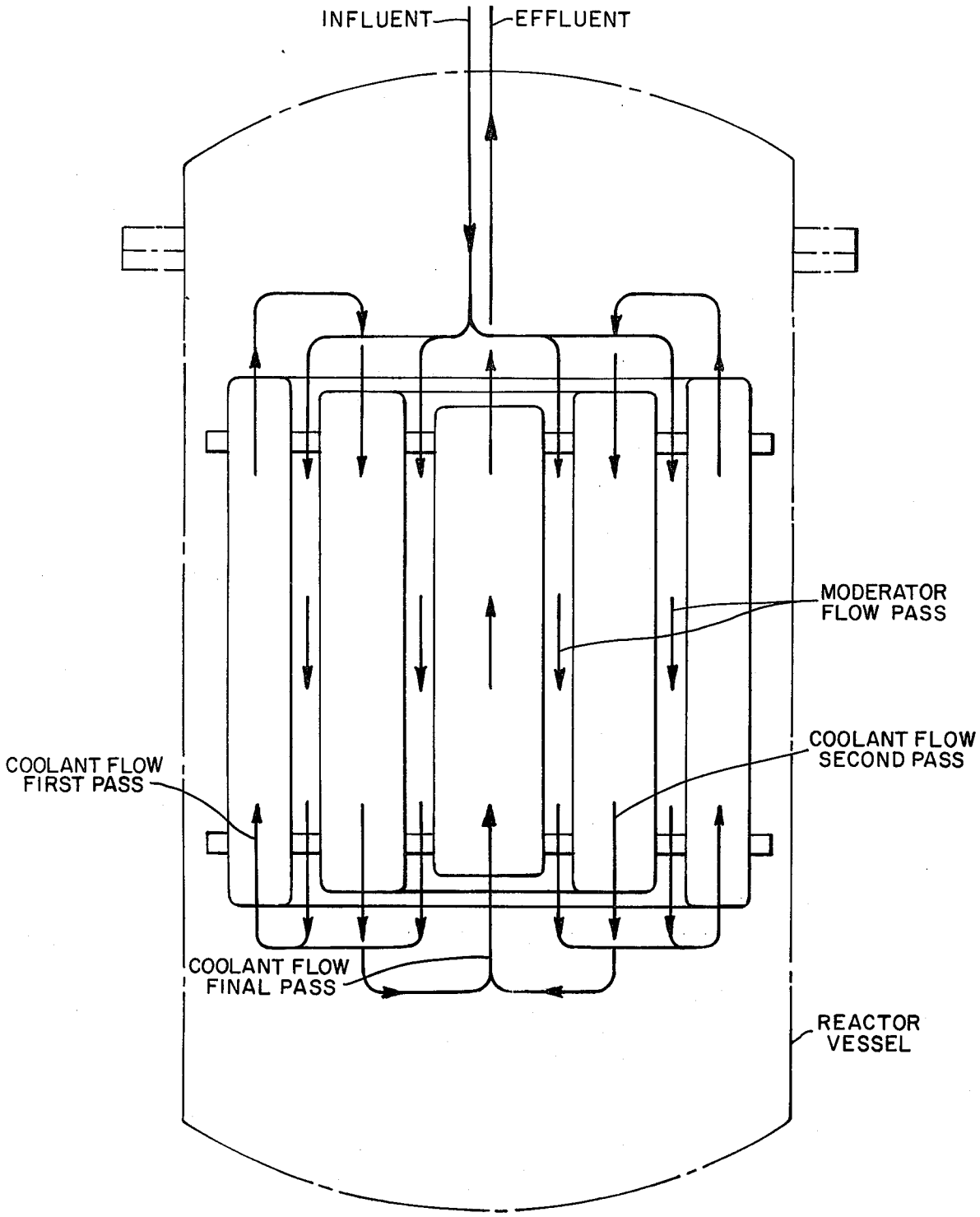

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 5, 1975

937 O.G. 12

T937,001
THERMAL NUCLEAR REACTOR

Wilfred H. Comtois, 129 Thornberry Drive, Pittsburgh, Pa. 15235, and John F. Patterson, 2213 Enterprise Drive, Highland, Wash. 99352

Filed Apr. 18, 1973, Ser. No. 352,373
**Int. Cl. G21c *15/02***
U.S. Cl. 176—51
4 Sheets Drawing. 17 Pages Specification

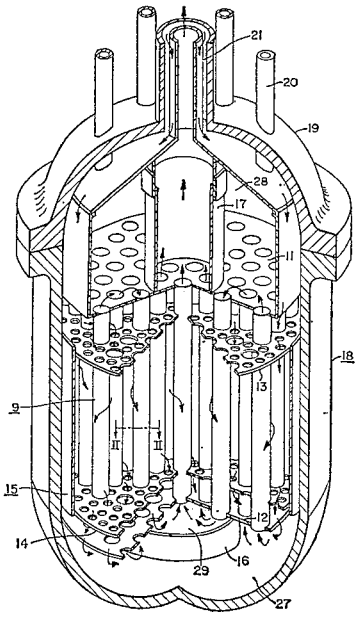

A thermal nuclear reactor which operates above the critical pressure and temperature of the reactor coolant. The reactor coolant achieves system operating conditions by making three or more passes through a core which is fueled with nuclear material. In one embodiment, the reactor coolant serves as a moderator and as a coolant.

THERMAL NUCLEAR REACTOR

Filed April 18, 1973 4 Sheets-Sheet 1